United States Patent
Tabuki

(10) Patent No.: US 10,462,316 B2
(45) Date of Patent: Oct. 29, 2019

(54) IMAGE PROCESSING APPARATUS, METHOD OF CONTROLLING IMAGE PROCESSING APPARATUS, AND STORAGE MEDIUM

(71) Applicant: CANON KABUSHIKI KAISHA, Tokyo (JP)

(72) Inventor: Masumi Tabuki, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/140,183

(22) Filed: Sep. 24, 2018

(65) Prior Publication Data
US 2019/0104227 A1    Apr. 4, 2019

(30) Foreign Application Priority Data
Sep. 29, 2017 (JP) .................. 2017-191755

(51) Int. Cl.
| | |
|---|---|
| H04N 1/04 | (2006.01) |
| H04N 1/00 | (2006.01) |
| B65H 5/00 | (2006.01) |
| H04N 1/333 | (2006.01) |
| H04N 1/23 | (2006.01) |

(52) U.S. Cl.
CPC ......... *H04N 1/00588* (2013.01); *B65H 5/002* (2013.01); *H04N 1/00652* (2013.01); *H04N 1/00832* (2013.01); *H04N 1/00933* (2013.01); *H04N 1/00978* (2013.01); *H04N 1/2346* (2013.01); *H04N 1/33376* (2013.01); *B65H 2801/39* (2013.01)

(58) Field of Classification Search
CPC ......... H04N 1/00588; H04N 1/00652; H04N 1/33376; H04N 1/2346; H04N 1/00832; H04N 1/00933; H04N 1/00978
USPC ........................................... 358/498
See application file for complete search history.

(56) References Cited

U.S. PATENT DOCUMENTS

| | | | | |
|---|---|---|---|---|
| 9,420,135 | B2 * | 8/2016 | Sunada | H04N 1/00588 |
| 10,148,851 | B2 * | 12/2018 | Furukawa | H04N 1/3263 |
| 2013/0194341 | A1 | 8/2013 | Ishizuka | |
| 2016/0057306 | A1 | 2/2016 | Kido | |
| 2017/0094093 | A1 | 3/2017 | Mori | |

FOREIGN PATENT DOCUMENTS

| | | |
|---|---|---|
| JP | 2010-54908 A | 3/2010 |
| JP | 2016134789 A | 7/2016 |

\* cited by examiner

*Primary Examiner* — Houshang Safaipour
(74) *Attorney, Agent, or Firm* — Canon U.S.A., Inc. IP Division

(57) ABSTRACT

The present invention is directed to a technique for reducing communication errors in facsimile transmission while restraining an increase in the temperature of a motor during execution of jobs of different types when a temperature reduction control is executed.

11 Claims, 8 Drawing Sheets

FIG.5

| JOB TYPE | SCANNING NUMBER | RESET TIME | MOTOR STOP TIME |
|---|---|---|---|
| HIGH-SPEED COPY JOB | 150 SCANS | 5 MIN. | 6 SEC. |
| FACSIMILE TRANSMISSION JOB | 180 SCANS | 7 MIN. | 3 SEC. |
| COPY JOB/ SCAN JOB | 200 SCANS | 4 MIN. | 5 SEC. |

FIG.6
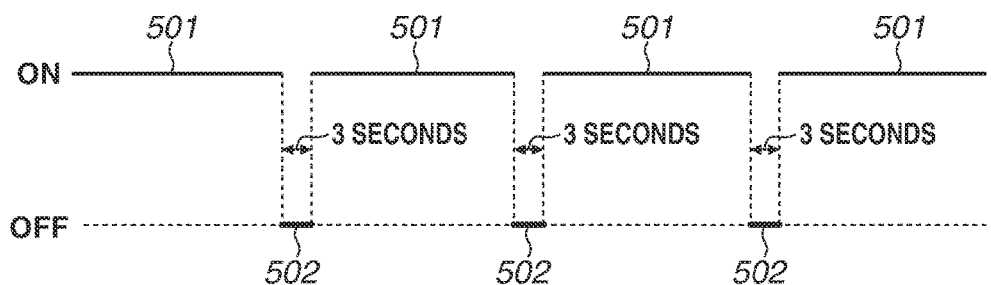
FACSIMILE TRANSMISSION JOB
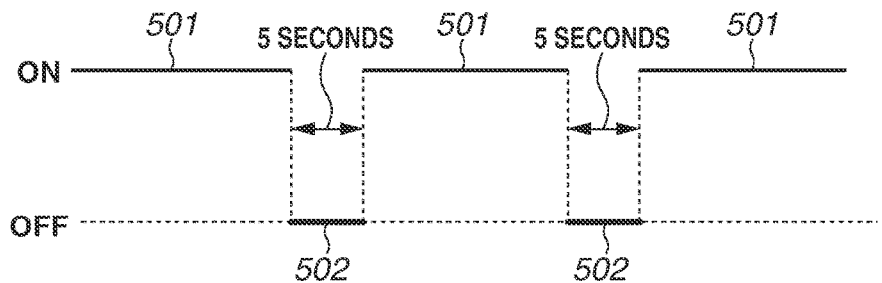
COPY JOB/SCAN JOB
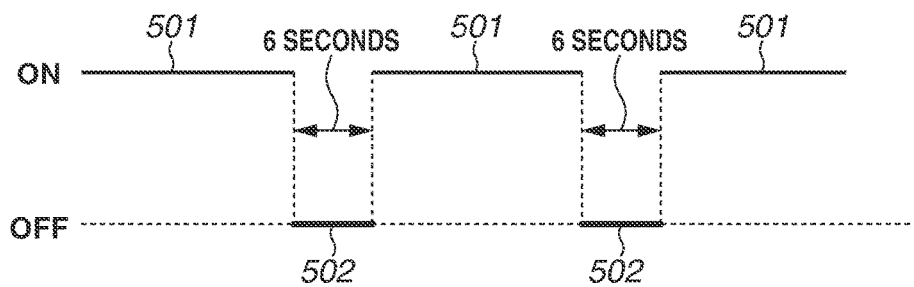
HIGH-SPEED COPY JOB

IMAGE PROCESSING APPARATUS, METHOD OF CONTROLLING IMAGE PROCESSING APPARATUS, AND STORAGE MEDIUM

BACKGROUND OF THE INVENTION

Field of the Invention

The present invention relates to an image processing apparatus, a method of controlling the same, and a storage medium.

Description of the Related Art

An image processing apparatus including an auto document feeder (ADF) conveys a document one by one from a stack of documents placed on the ADF and reads an image on the conveyed document to generate image data. The image data generated by the image processing apparatus reading the document is used in a job such as a copy job and a facsimile transmission job.

As the number of documents conveyed by the ADF increases, a motor for driving various rollers that convey the documents is continuously driven. When the motor is continuously driven for a long time, a temperature of the motor increases. To improve this phenomenon, there is known a technique in which the image processing apparatus performs a temperature reduction control to stop the motor each time one document is conveyed so that an increase in the temperature of the motor is restrained (see Japanese Patent Application Laid-Open No. 2010-54908).

In the image processing apparatus as discussed in Japanese Patent Application Laid-Open No. 2010-54908 in which driving of the motor is stopped each time one document is conveyed, the stop time of the motor is uniform regardless of a job type. Further, in the image processing apparatus as described above, as the stop time is longer, the temperature increase of the motor is restrained more.

A facsimile transmission job is one of jobs that can be executed by the image processing apparatus as described above. The facsimile transmission job is a job of transmitting, in conformity with facsimile communication standards, image data generated by a scanner reading an image on a document. The facsimile communication standards stipulate that if a state of receiving no image data is continued for a predetermined time, a timeout notification is transmitted to a reception-side image processing apparatus. At this time, the reception-side image processing apparatus disconnects the communication with a transmission-side image processing apparatus according to the timeout notification. Consequently, the transmission-side image processing apparatus can no longer continue to transmit the image data, and the facsimile transmission job is suspended. If the stop time of the motor is set longer than the predetermined time while a document is conveyed, a state of receiving no image data at the reception-side image processing apparatus is continued for the predetermined time or longer, whereby the timeout notification is transmitted to the reception-side image processing apparatus. Thus, in the facsimile transmission job, the stop time of driving of the motor in the transmission-side image processing apparatus is desirably set shorter than the predetermined time during operation of the temperature reduction control.

In a case of a job of a different type from the facsimile transmission job, however, the job is not stopped even if a time period with no image data to be processed next is continued. Thus, in the case of the job of a different type from the facsimile transmission job, the stop time of the motor is desirably set longer than that of the facsimile transmission job so that an increase in the temperature of the motor is restrained more during execution thereof than during execution of the facsimile transmission job.

SUMMARY OF THE INVENTION

According to an aspect of the present invention, an image processing apparatus includes a document sheet conveyance unit configured to drive a driving portion to convey document sheets one by one from a stack of document sheets, a reading unit configured to read an image on the document sheet conveyed by the document sheet conveyance unit, a transmission unit configured to transmit, by facsimile, image data generated by the reading unit reading the document sheet to an external image processing apparatus, an output unit configured to output the image data generated by the reading unit reading the document sheet using a method different from transmission by facsimile, and a conveyance control unit configured to stop driving of the driving portion for a predetermined time period after the document sheet conveyance unit completes conveyance of one document sheet and before the document sheet conveyance unit conveys a next document sheet, wherein the predetermined period is a first time period when the conveyance control unit stops the driving portion while a first job of transmitting the image data by facsimile is executed by the transmission unit concurrently with the reading of the document sheet by the reading unit, wherein the first time period is shorter than a reference time period for disconnecting a line with the image processing apparatus in a case where the external image processing apparatus does not receive the image data continuously, and wherein the predetermined period is a second time period when the conveyance control unit stops the driving portion while a second job of outputting the image data is executed by the output unit concurrently with the reading of the document sheet by the reading unit, wherein the second time period is longer than the first time period.

Further features of the present invention will become apparent from the following description of embodiments with reference to the attached drawings.

BRIEF DESCRIPTION OF THE DRAWINGS

FIG. 5 is a table storing parameters used when the image processing apparatus executes a temperature reduction control.

FIG. 6 is a schematic diagram illustrating operations performed when the image processing apparatus executes the temperature reduction control.

DESCRIPTION OF THE EMBODIMENTS

Various embodiments of the present invention will be described below with reference to the drawings.

Figure 1:
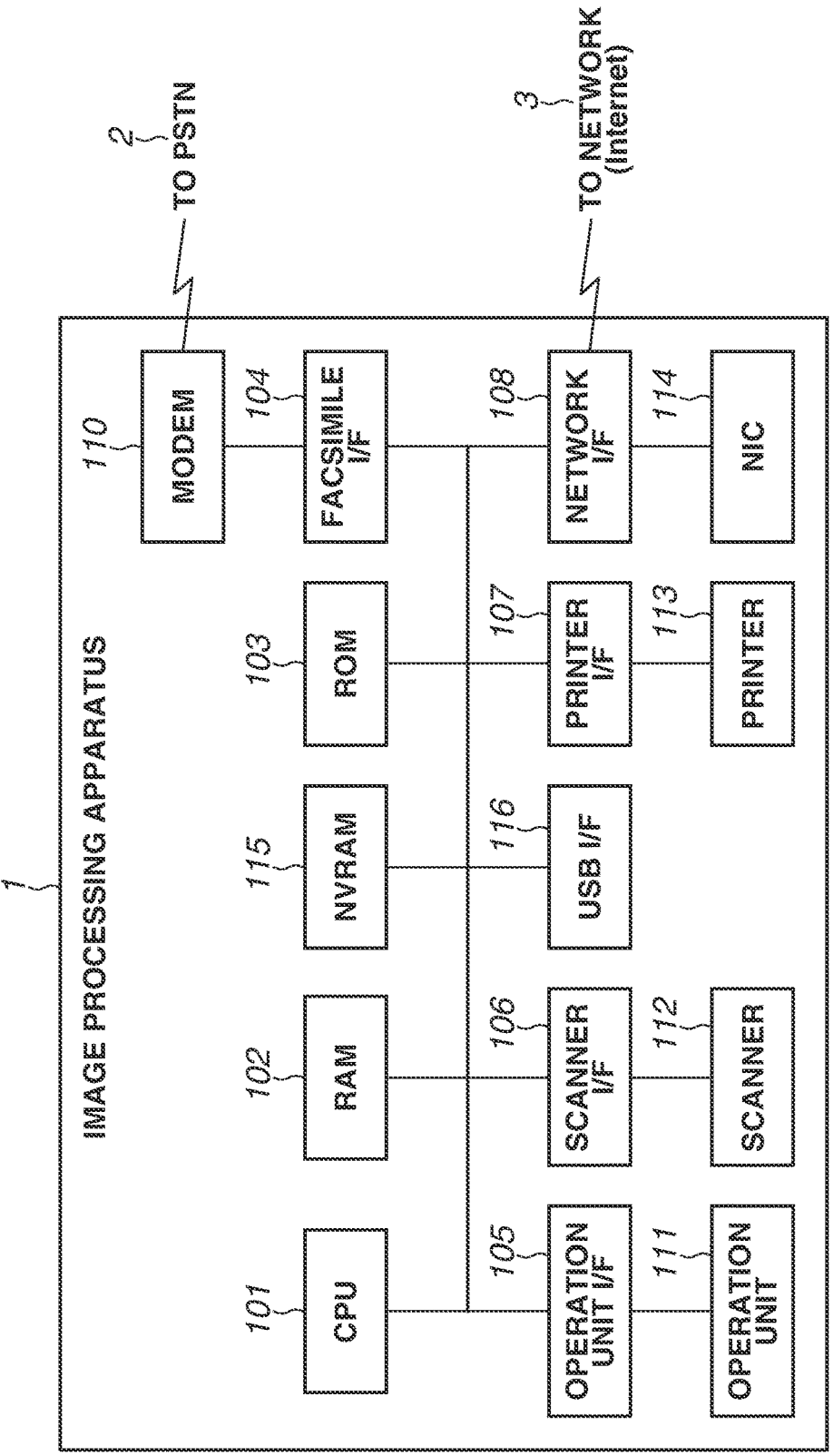
FIG. 1 is a block diagram illustrating an example of a hardware configuration of an image processing apparatus according to an embodiment.

FIG. 1 is a block diagram illustrating an example of a hardware configuration of an image processing apparatus 1 that functions as an image processing apparatus according to an embodiment of the present invention.

The image processing apparatus 1 includes a central processing unit (CPU) 101, a random access memory (RAM) 102, a read-only memory (ROM) 103, a facsimile interface (I/F) 104, an operation unit I/F 105, a scanner I/F 106, a printer I/F 107, a network I/F 108, a non-volatile RAM (NVRAM) 115, and a universal serial bus (USB) I/F 116.

The image processing apparatus 1 further includes a modem 110, an operation unit 111, a scanner 112, a printer 113, and a network interface card (NIC) 114.

The CPU 101 controls operations of the entire image processing apparatus 1. The CPU 101 comprehensively controls each device connected to a system bus 109 according to a program stored in the ROM 103.

The RAM 102 functions as a main memory of the CPU 101 and a work area and is also used as an image information storage area.

The ROM 103 stores various fonts, various control programs to be executed by the CPU 101, and various data. The NVRAM 115 stores data of facsimile documents received via the facsimile I/F 104. Thus, even if the image processing apparatus 1 is turned off, the NVRAM 115 retains image data received via the facsimile I/F 104. Further, the NVRAM 115 stores a scan count counted by a scan counter and an elapsed time from completion of a scan. The scan counter is a counter that counts the number of documents conveyed by an automatic document feeder (ADF) 201 of the scanner 112. The elapsed time from completion of a scan is a value that indicates an elapsed time from when previous conveyance of a document is completed while the image processing apparatus 1 performs a temperature reduction control to restrain an increase in the temperature of the motor.

The facsimile I/F 104 is connected to a public switched telephone network (PSTN) 2 via the modem 110. The image processing apparatus 1 is capable of transmitting and receiving facsimile information to and from another facsimile apparatus via the PSTN 2.

The facsimile I/F 104 transmits a scan image input via the scanner I/F 106 to the PSTN 2. Further, the facsimile I/F 104 performs control to store the data of the facsimile documents received via the PSTN 2 in the NVRAM 115.

The operation unit I/F 105 is an interface for controlling the operation unit 111 for making various settings of the image processing apparatus 1. The operation unit 111 includes an input device such as a touch panel and a numeric keypad and a display device such as a display.

The scanner I/F 106 is an interface for controlling the scanner 112 (scanner engine).

The printer I/F 107 is an interface for controlling the printer 113 (printer engine). The image processing apparatus 1 controls the printer 113 via the printer I/F 107 to output an image using image data that is generated by the scanner 112 reading a document.

The network I/F 108 controls the NIC 114 for connecting to a wired local area network (LAN) and a wireless LAN.

The network I/F 108 receives a print job via a network 3 and transmits image data acquired by the scanner I/F 106.

The USB I/F 116 is an interface for controlling a USB memory, which is a storage apparatus connectable to the image processing apparatus 1. The image processing apparatus 1 performs memory control to store the image data that is generated by the scanner 112 reading a document in the USB memory via the USB I/F 116. The USB I/F 116 outputs the image data to the USB memory connected to the image processing apparatus 1.

Figure 2:
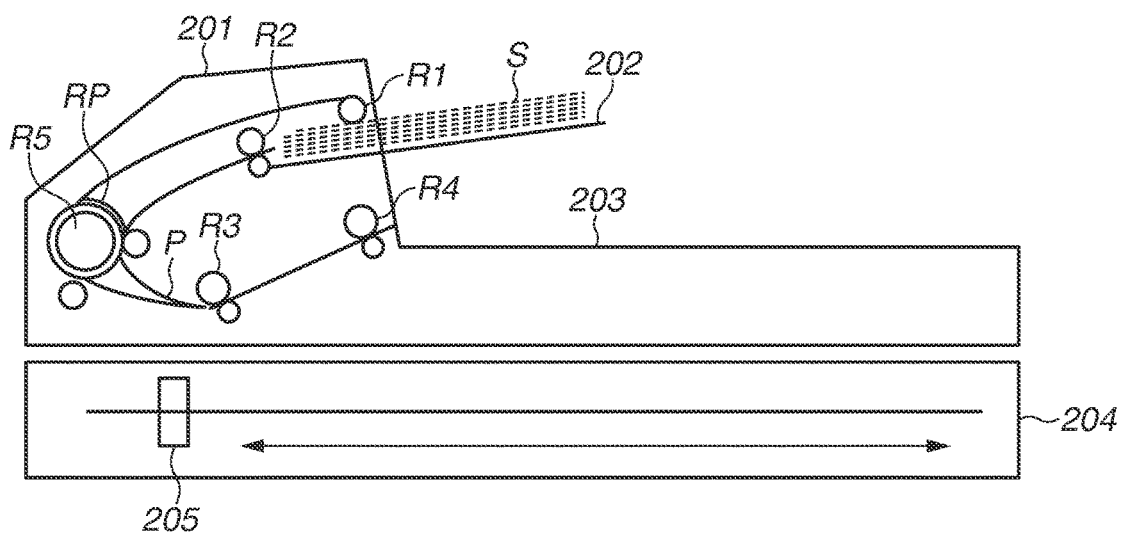
FIG. 2 is a longitudinal cross-sectional view illustrating an internal configuration of a scanner of the image processing apparatus.

FIG. 2 is a longitudinal cross-sectional view illustrating an internal configuration of the scanner 112 of the image processing apparatus 1.

The scanner 112 includes the ADF 201, a sheet feeding tray 202, a sheet discharging tray 203, a platen glass 204, and a scanner unit 205.

The ADF 201 conveys a document one by one from a stack of documents S placed on the sheet feeding tray 202 along a conveyance path P. The ADF 201 conveys one document, discharges the conveyed document to the sheet discharging tray 203, and conveys the next document to the conveyance path P.

The ADF 201 reads an image on the document conveyed from the sheet feeding tray 202 using the scanner unit 205 and discharges the document to the sheet discharging tray 203 (discharging portion).

Operation from feeding of a document to discharging of the document will be described below with reference to FIG. 2. First, the stack of documents S placed on the sheet feeding tray 202 is separated into single sheets by a sheet feeding roller R1 and a separation roller R2. Then, each of the separated documents is fed to the conveyance path P.

A large roller R5 on the conveyance path P conveys the separated and fed document to a conveying roller R3. A discharge roller R4 is provided further downstream of the conveying roller R3, and the discharge roller R4 nips the conveyed document and discharges the document to the sheet discharging tray 203.

The ADF 201 includes a reversal conveyance path RP (reverse-path) for switching front and back surfaces of a document to read both sides of the document, although a detailed description of a mechanism thereof is omitted herein. In the present embodiment, the ADF 201 first conveys the document toward the sheet discharging tray 203. Next, the rollers are rotated in a reverse direction to convey the document to the reversal conveyance path RP. Then, the document is conveyed from the reversal conveyance path RP to the conveyance path P again. In this way, the scanner unit 205 can read the both sides of the document. In the present embodiment, one scanner unit reads the both sides of the document. Alternatively, two scanner units may be provided to read the front and back surfaces, respectively, of the document.

The rollers are controlled by an ADF motor driving circuit 311 of a document conveyance unit 301 in FIG. 3 described below.

The scanner unit 205 reads an image on a document conveyed by the ADF 201 and on a document placed on the platen glass 204. The scanner unit 205 is controlled by a scanner unit control unit 302 described below.

In a case of reading the image on the document conveyed by the ADF 201, the scanner 112 fixes a reading position used by the scanner unit 205. Meanwhile, in a case of reading the image on the document placed on the platen glass 204, the scanner 112 reads the document while moving the scanner unit 205 in a sub-scanning direction, which is the direction of the arrow in FIG. 2.

The scanner unit 205 is a unit including a light emitting diode (LED), a lens, an image sensor, etc. integrated together. The LED irradiates the document with light. The lens allows reflection light from the document to enter. The image sensor detects an image. A detailed description of the scanner unit 205 is omitted herein.

Figure 3:
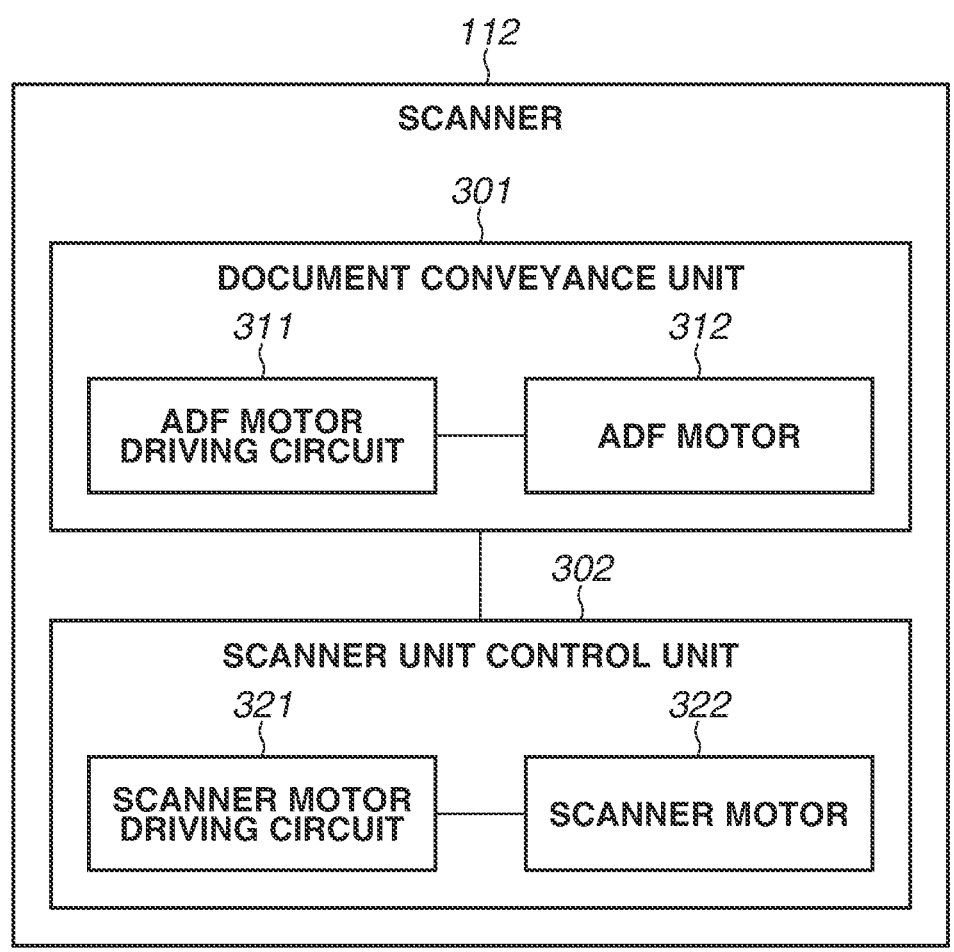
FIG. 3 is a block diagram illustrating an example of a hardware configuration of the scanner of the image processing apparatus.

FIG. 3 is a block diagram illustrating an example of a hardware configuration of the scanner 112 of the image processing apparatus 1. The scanner 112 includes the document conveyance unit 301 that controls the ADF 201 and the scanner unit control unit 302 that controls the scanner unit 205.

The document conveyance unit 301 includes an ADF motor 312 and the ADF motor driving circuit 311. The ADF motor 312 is a motor for driving the rollers required for the ADF 201 to feed and convey a document, and functions as a driving portion. The ADF motor driving circuit 311 is a circuit for performing control to start and stop rotation of the rollers according to an instruction from the CPU 101. The ADF motor driving circuit 311 is also capable of controlling a rotation direction of the motor.

A driving force of the ADF motor 312 is transmitted via a gear (not illustrated) to the sheet feeding roller R1, the separation roller R2, the conveying roller R3, the discharge roller R4, the large roller R5, etc. illustrated in FIG. 2.

The scanner unit control unit 302 includes a scanner motor 322 and a scanner motor driving circuit 321. The scanner motor 322 is a motor for controlling movement of the scanner unit 205. The scanner motor driving circuit 321 is a circuit for controlling driving of the scanner unit 205 according to an instruction from the CPU 101. The control by the scanner motor driving circuit 321 enables the scanner unit 205 to move in the sub-scanning direction.

The scanner unit control unit 302 has the function of controlling the LED (not illustrated), the lens (not illustrated), and the image sensor (not illustrated) included in the scanner unit 205 according to an instruction from the CPU 101.

Next, operation up to execution of a job by a user on the image processing apparatus 1 will be described below with reference to FIG. 4.

The operation unit 111 includes a display 600, a numeric keypad 603, a clear/stop key 604, and a start key 605. The display 600 is a display configured to display job setting values and the like and includes a touch panel for receiving a user touch operation. The numeric keypad 603 includes physical keys for inputting numbers. The user can input the number of copies and a facsimile number of a facsimile transmission destination using the numeric keypad 603. The clear/stop key 604 is a key for resetting job settings displayed on the display 600 and for stopping a job being executed. The start key 605 is a key for starting a job. At a press of the start key 605 by the user, the image processing apparatus 1 executes a job using the setting values set via the display 600.

Figure 4:
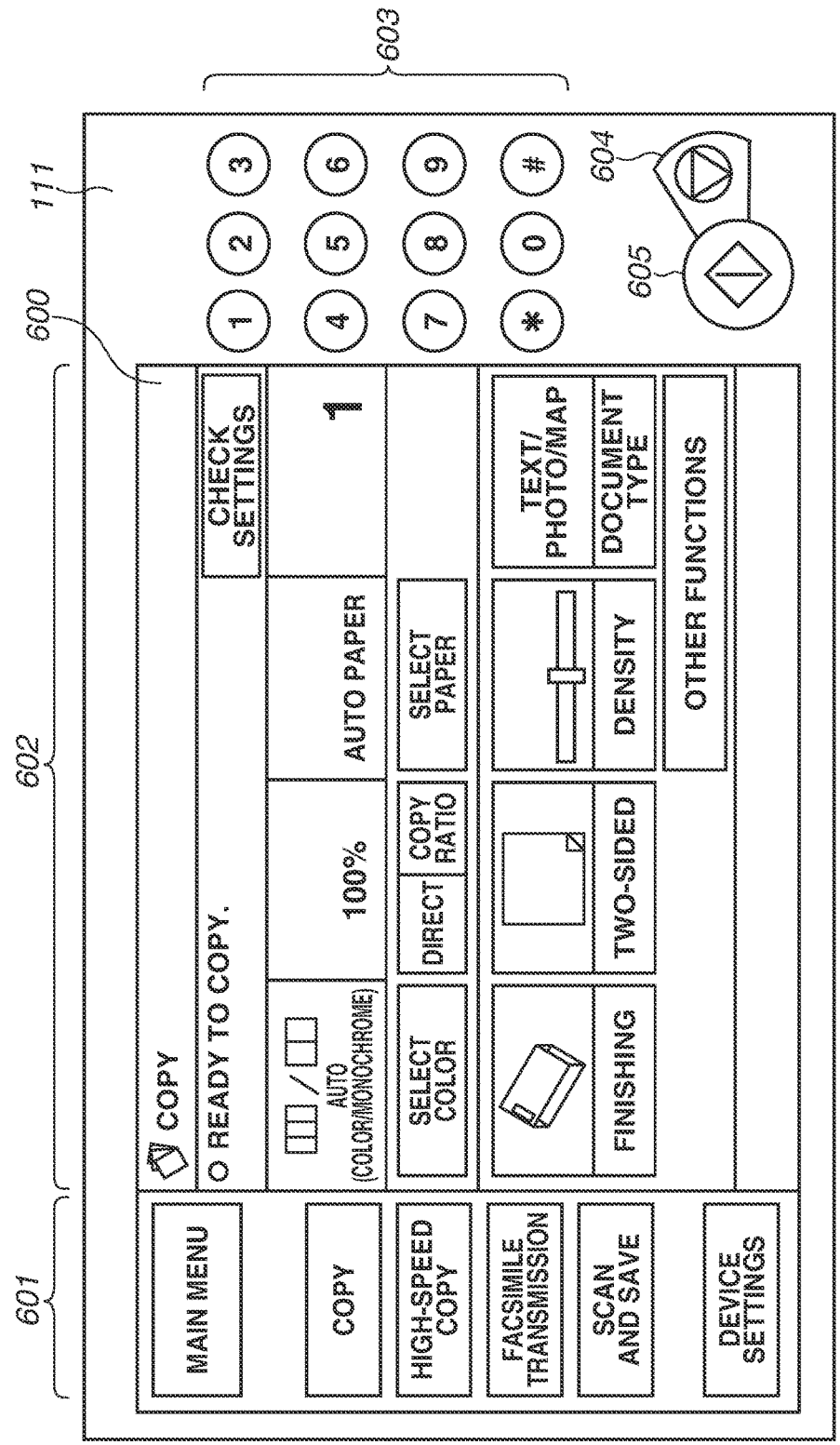
FIG. 4 illustrates an example of a configuration of an operation unit illustrated in FIG. 1 and an example of a screen displayed on a display.

FIG. 4 illustrates an example of a basic copy screen for setting the setting values of a copy job displayed on the display 600. The basic copy screen includes a menu region 601 and a function display region 602. The menu region 601 is a region for selecting a function to be used by the user. A type of the job selected via the menu region 601 is stored in the RAM 102.

"COPY" is the function of reading a document using the scanner 112 to generate image data and printing an image using the printer 113.

"HIGH-SPEED COPY" is the function of reading a document in a shorter time than that of the "COPY" function and printing an image. A high-speed copy job is a job executed with lower reading resolution by the scanner 112 than that of a copy job to reduce the time required for reading the document. In the high-speed copy job, the number of rotations of the motor to convey a document by the ADF 201 is greater than that in a job of other types, and thereby a load on the motor is higher. Further, an amount of heat accumulated in the motor per one document conveyed is greater in the high-speed copy job than in a job of other types.

In the present embodiment, the high-speed copy job is executed if "HIGH-SPEED COPY" is selected on the menu region 601. Alternatively, the high-speed copy may be settable on the basic copy screen. For example, the high-speed copy may be selectable at the time of setting "DOCUMENT TYPE" on the basic copy screen.

"FACSIMILE TRANSMISSION" is the function of transmitting image data, which is generated by the scanner 112 reading a document, via the PSTN 2. In the "FACSIMILE TRANSMISSION" function, document reading by the scanner 112 and transmission of image data generated by the document reading are performed concurrently.

"SCAN AND SAVE" is the function of saving image data acquired by the scanner 112 reading a document in the USB memory connected to the image processing apparatus 1 via the USB I/F 116.

The function display region 602 is the region for displaying a screen for making the settings of the function selected by the user on the menu region 601. In FIG. 4, the basic copy screen is displayed in response to selection of "COPY" on the menu region 601. The image processing apparatus 1 switches the screen displayed on the function display region 602 according to the function selected on the menu region 601. The setting values set on the function display region 602 is stored in the RAM 102.

Operation performed by the image processing apparatus 1 according to the present embodiment to execute a job will be described below with reference to FIGS. 5 and 6. If the number of documents conveyed by the ADF 201 exceeds a scanning number (number of scans) 402 determined for each of the job types, the image processing apparatus 1 executes a temperature reduction control to restrain an increase in a temperature of the ADF motor 312.

FIG. 5 illustrates a temperature reduction control information table used by the image processing apparatus 1 to perform the temperature reduction control. The temperature reduction control information table is stored in the ROM 103.

A job type 401 indicates a job type of a job executed by the image processing apparatus 1. In the present embodiment, the job type is classified into a high-speed copy job, a facsimile transmission job, and a copy job/scan job according to a load applied to the motor during execution of the job. The classification categories, however, do not have to be those described above. The high-speed copy job is the job executed if "HIGH-SPEED COPY" is selected on the menu region 601. The facsimile transmission job is the job executed if "FACSIMILE TRANSMISSION" is selected on the menu region 601. The copy job/scan job is the job executed if "COPY" or "SCAN AND SAVE" is selected on the menu region 601.

The scanning number 402 indicates the number of documents conveyed continuously by the ADF 201 until the image processing apparatus 1 starts performing the temperature reduction control. For example, in a case where the high-speed copy job is executed, the CPU 101 starts performing the temperature reduction control if the number of documents conveyed continuously by the ADF 201 exceeds 150. The CPU 101 determines whether to perform the temperature reduction control based on the number of documents conveyed continuously by the ADF 201. In this way, the image processing apparatus 1 can start the temperature reduction control to restrain an excessive increase in the temperature of the motor without any thermometer or any mechanism for measuring the temperature of the motor.

The scanning number 402 is determined based on the number of documents conveyed by the ADF 201 until the temperature of the motor reaches a threshold value (e.g., 100 degrees Celsius) or above when a job of various types is executed. Thus, the scanning number 402 is different depending on the job type. For example, in the high-speed copy job in which a rotation speed of the motor of the ADF 201 is high, the temperature of the motor is more likely to increase than that in a job of other types, so that the scanning number until a start of the temperature reduction control is set smaller than that in the job of the other types. Further, in the facsimile transmission job, the motor stop time during the temperature reduction control is shorter than those in the scan job and the copy job, so that the temperature of the motor is more likely to increase. Thus, the scanning number of the facsimile transmission job is set smaller than the scanning numbers of the scan job and the copy job.

In the present embodiment, a different scanning number is set for each of the job types as described above. Alternatively, the scanning number may be set uniform regardless of the job types. In that case, the scanning numbers of the other job types are desirably adjusted to the scanning number of the high-speed copy job in which the number of rotations of the motor is large and the temperature of the motor is likely to increase.

A reset time 403 is the time period from when the image processing apparatus 1 starts performing the temperature reduction control to when the counter counting the number of documents conveyed by the ADF 201 is reset. The image processing apparatus 1 measures the time period from when the ADF 201 completes conveyance of a document to when the ADF 201 starts conveying the next document. If the measured time is longer than the time stored as the reset time 403, the CPU 101 sets a count of the scan counter counting the number of scans to zero. Meanwhile, if the measured time period is shorter than the reset time 403, the CPU 101 increases the count of the scan counter by one according to the document reading. The reset time 403 is determined based on the time needed for the temperature of the motor to decrease to a normal temperature (e.g., 60 degrees Celsius) in a case where the ADF motor 312 is driven up to the scanning number 402 interposing a motor stop time 404 that are stored in the temperature reduction control information table. In the present embodiment, in a case of the high-speed copy job, if an elapsed time from when conveyance of a document is completed to when the next document is conveyed is five minutes or longer, the CPU 101 resets the count of the scan counter. If the rotation speed of the ADF motor 312 is the same, the shorter the motor stop time 404 described below is, the longer the reset time 403 becomes, and the longer the motor stop time 404 is, the shorter the reset time 403 becomes. Time is provided from when the conveyance of a document is completed to when the count of the scan counter is reset, so that the temperature reduction control is performed based on the scanning number even if jobs are continuously executed. In this way, an increase in the temperature of the motor is restrained in the case where jobs are continuously executed.

The motor stop time 404 is the time period during which the CPU 101 stops the motor from when the conveyance of a document is completed to when the conveyance of the next document is started during an operation of the temperature reduction control by the image processing apparatus 1. In the facsimile transmission job, the motor stop time 404 is the time period determined based on a time period in which the facsimile transmission job is not suspended even if there is no image data to be transmitted next when the facsimile transmission job is executed. In facsimile transmission, international standards standardized by the International Telecommunication Union Telecommunication Standardization Sector (ITU-T) are used. In facsimile transmission and reception using Group 3 (G3) standards, which are facsimile communication standards, a notification of a communication error is transmitted if an image processing apparatus that is to receive a facsimile is in a state of receiving no image data continuously for six seconds. The image processing apparatus that is to receive image data disconnects the communication with a transmission-side image processing apparatus if the state of receiving no image data is continued for six seconds or longer. The transmission-side image processing apparatus determines that the communication with the reception-side image processing apparatus is disconnected if no signal is received from the reception-side image processing apparatus for a predetermined time from when image data is transmitted. If the communication with the reception-side image processing apparatus is disconnected, the transmission-side image processing apparatus can no longer transmit generated image data to the reception-side image processing apparatus. To transmit image data without causing any communication error, the image processing apparatus that is to transmit the image data needs to generate and transmit image data of the next document within six seconds from completion of reception of image data of a previous page by the reception-side image processing apparatus. Thus, the motor stop time 404 during execution of a facsimile transmission job is set shorter than six seconds. The standards to be used in facsimile transmission are not limited to the G3 facsimile standards, and the motor stop time of the facsimile transmission job may be any value determined based on the time period until the transmission of a notification of a communication error in the state of receiving no image data, which is stipulated in the communication standards for use in facsimile transmission.

Meanwhile, in the case of the high-speed copy job and the copy job/scan job, the motor stop times are set longer than the motor stop time of the facsimile transmission job. In this way, the image processing apparatus 1 restrains an increase in the temperature of the motor in the high-speed copy job and the copy job/scan job. Further, the motor stop times in the high-speed copy job and the copy job/scan job are set shorter than the motor stop time in the facsimile transmission job to allow the reset time therein to be set shorter than the reset time in the facsimile transmission job. The motor stop times in the high-speed copy job and the copy job/scan job can be longer than those specified in FIG. 5.

In the present embodiment, the motor stop time in the high-speed copy job is longer than the motor stop time in the copy job/scan job. In the high-speed copy job, the number of rotations during execution of the job is greater than that in the copy job/scan job, so that the temperature of the motor is more likely to increase. Thus, the motor stop time in the high-speed copy job is set longer than that in the copy job/scan job to restrain an increase in the temperature of the motor.

The image processing apparatus 1 executes the temperature reduction control according to the temperature reduction control information table illustrated in FIG. 5. For example, in a case where the image processing apparatus 1 executes the high-speed copy job, the ADF 201 continuously conveys documents until the number of documents conveyed by the ADF 201 reaches 150 and reads the documents using the scanner unit 205. As to the 151st and subsequent documents, after the document is discharged, the CPU 101 stops the driving of the ADF motor 312 for six seconds. Then, after the six seconds, the CPU 101 drives the ADF motor 312 again, and the ADF 201 restarts conveying a document. Then, if an instruction to execute a copy job is given after five minutes have passed from the previous completion of document conveyance, the CPU 101 resets the scanner count. Meanwhile, if an instruction to execute a copy job is given within five minutes from the previous completion of document conveyance, the image processing apparatus 1 continues to execute the temperature reduction control.

In the present embodiment, the scanning number 402, the reset time 403, and the motor stop time 404 are set differently for each of the job types as illustrated in FIG. 5. In this way, the image processing apparatus 1 can change the motor stop time and/or the scan count reset time according to the job type to be executed.

FIG. 6 schematically illustrates operation of the motor during the temperature reduction control by the image processing apparatus 1.

In each of the job types, if the count of the scan counter reaches or exceeds the scanning number 402, the ADF motor 312 performs operation illustrated in FIG. 6. A period 501 indicates a period during which the ADF motor 312 is driven and a document is conveyed. During the period 501, the ADF 201 conveys one document from the sheet feeding tray 202 and discharges the document to the sheet discharging tray 203. A period 502 indicates a period during which the ADF motor 312 is stopped. Length of the period 502 is determined based on the motor stop time 404 specified in the temperature reduction control information table in FIG. 5. In FIG. 6, the length of the period 502 is three seconds for the facsimile transmission job, five seconds for the copy job/scan job, and six seconds for the high-speed copy job. At this time, the period 502 in the facsimile transmission job is set shorter than the period 502 in the copy job/scan job and the period 502 in the high-speed copy job. In this way, a communication error due to absence of image data to be transmitted in the facsimile transmission job can be prevented. Further, an increase in the temperature of the motor can be restrained more in the copy job/scan job and the high-speed copy job than in the facsimile transmission job, and the time needed for decreasing the temperature of the motor after the execution of the job can be reduced.

The scan processing in the present embodiment will be described below with reference to FIGS. 7 and 8.

Figure 7:
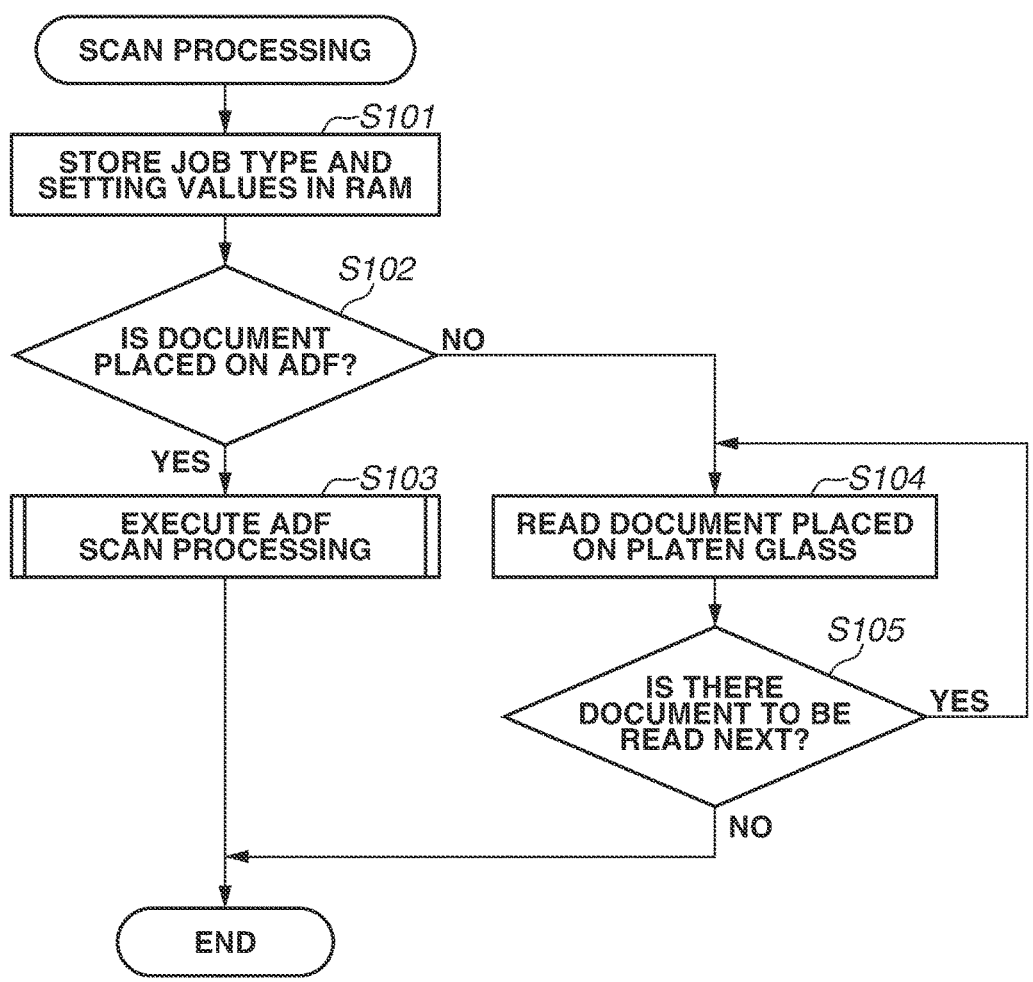
FIG. 7 is a flowchart illustrating a scan process by the image processing apparatus according to an embodiment.

A program for executing the flowchart illustrated in FIG. 7 is stored in the ROM 103 of the image processing apparatus 1, and the CPU 101 reads and executes the program to achieve the process.

The process illustrated in FIG. 7 is started at a press of the start key 605 by the user in a state where any of "COPY", "HIGH-SPEED COPY", "FACSIMILE TRANSMISSION", and "SCAN AND SAVE" is selected on the menu region 601.

First, in step S101, the CPU 101 stores a job type and setting values set via the operation unit 111 in the RAM 102. The job type is the type of the job displayed on the display 600 when the start key 605 is pressed. For example, in a case where "COPY" is displayed in the function display region 602 of the display 600, the CPU 101 stores the copy job as the job type in the RAM 102. In a case where "HIGH-SPEED COPY" is displayed in the function display region 602 of the display 600, the CPU 101 stores the high-speed copy job as the job type in the RAM 102. In a case where "FACSIMILE TRANSMISSION" is displayed in the function display region 602 of the display 600, the CPU 101 stores the facsimile transmission job as the job type in the RAM 102. In a case where "SCAN AND SAVE" is displayed in the function display region 602 of the display 600, the CPU 101 stores the scan job as the job type in the RAM 102. The setting values are the job setting values set by the user via the screen displayed in the function display region 602 of the display 600.

Next, in step S102, the CPU 101 determines whether a document is placed on the sheet feeding tray 202 of the ADF 201. The ADF 201 includes a sensor (not illustrated) that detects whether a document is placed thereon. The CPU 101 acquires a result of detection by the sensor and determines whether a document is placed on the sheet feeding tray 202 of the ADF 201.

If the CPU 101 determines that the document is placed on the ADF 201 (YES in step S102), in step S103, the CPU 101 executes ADF scan processing that will be described below with reference to FIG. 8. If reading of all the documents placed on the sheet feeding tray 202 of the ADF 201 is completed, the CPU 101 ends the process illustrated in FIG. 7.

In step S102, if the CPU 101 determines that no document is placed on the sheet feeding tray 202 (NO in step S102), the processing proceeds to step S104. A case where no document is placed on the sheet feeding tray 202 refers to a case where a document is placed on the platen glass 204. In step S104, the CPU 101 reads the document placed on the platen glass 204. The CPU 101 drives the scanner motor 322 through the scanner motor driving circuit 321 to read the document placed on the platen glass 204 using the scanner unit 205.

After the reading of the document is completed, in step S105, the CPU 101 determines whether there is a document to be read next. The CPU 101 displays, on the display 600, a screen to prompt the user to specify whether there is a document to be read next. The CPU 101 is to determine whether there is a document to be read next based on a user operation received via the operation unit 111. If an instruction to continue the reading is given (YES in step S105), the CPU 101 scans the document placed on the platen glass 204 using the scanner 112. Meanwhile, in step S105, if the CPU 101 determines that there is no document to be read next (NO in step S105), the process illustrated in FIG. 7 is ended.

Figure 8:
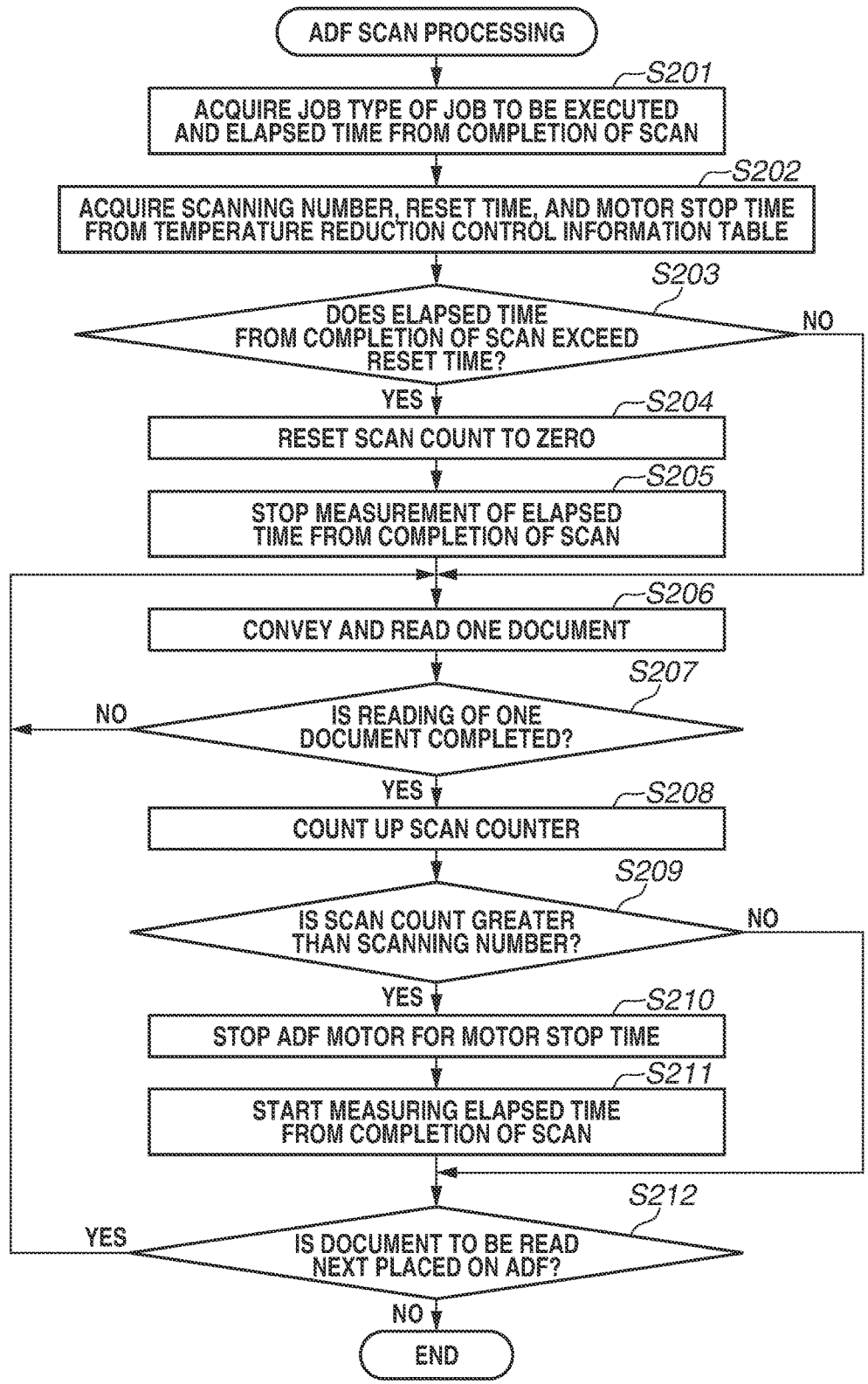
FIG. 8 is a flowchart illustrating an auto document feeder (ADF) scan process by the image processing apparatus according to an embodiment.

FIG. 8 is a flowchart illustrating a process of the ADF scan in step S104 by the image processing apparatus 1 in the present embodiment. A program for executing the process illustrated in FIG. 8 is stored in the ROM 103, and the CPU 101 reads the program from the ROM 103 and executes the program to achieve the process.

In step S201, the CPU 101 acquires the elapsed time from completion of a scan stored in the NVRAM 115 and the job type stored in the RAM 102. The elapsed time from completion of a scan is a measured time from when conveyance of a document is completed to when the next document is conveyed while the image processing apparatus 1 performs the temperature reduction control. An initial value of the elapsed time from completion of a scan is 0 seconds, and when the image processing apparatus 1 does not perform the temperature reduction control, the elapsed time from completion of a scan is set to 0 seconds. There are cases in which the ADF 201 starts a job of conveying a document after the temperature reduction control is started and before the reset time passes from the conveyance of a last document by the ADF 201. At this time, the scan counter stores the number of documents conveyed continuously until the last document of the previous job is conveyed. In step S202, the CPU 101 acquires, from the temperature reduction control information table stored in the ROM 103, the scanning number 402, the reset time 403, and the motor stop time 404 corresponding to the job type acquired in step S201.

Then, in step S203, the CPU 101 determines whether the elapsed time from completion of a scan that is acquired in step S201 exceeds the reset time 403 acquired in step S202. If the elapsed time from completion of a scan does not exceed the reset time 403 (NO in step S203), the processing proceeds to step S206 described below. The case where the elapsed time from completion of a scan does not exceed the reset time 403 is the case where conveyance of the next document is started before the reset time 403 passes from when conveyance of the previous document is completed. At this time, a temperature of the ADF motor 312 driven by the ADF motor driving circuit 311 may not be sufficiently reduced. Thus, the CPU 101 executes step S206 and the subsequent steps without resetting the scan count.

In step S203, if the elapsed time from completion of a scan exceeds the reset time 403 (YES in step S203), in step S204, the CPU 101 resets the scan count stored in the NVRAM 115 to zero. In the case where the elapsed time from completion of a scan exceeds the reset time 403, it is assumed that the temperature of the ADF motor 312 is sufficiently decreased. Thus, the CPU 101 resets the scan count to zero and performs control so as not to perform the temperature reduction control continuously.

Next, in step S205, the CPU 101 stops measurement of the elapsed time from completion of a scan and stores the measured time in the NVRAM 115. In step S205, the temperature of the ADF motor 312 is sufficiently decreased so that the CPU 101 stops the measurement of the elapsed time from completion of a scan that is to be stored in the NVRAM 115.

Then, in step S206, the CPU 101 controls the ADF motor driving circuit 311 and the scanner motor driving circuit 321 to convey the document to a predetermined reading position on the conveyance path P, and reads the document using the scanner unit 205. In step S206, image data generated by reading the document is stored in the RAM 102. The processing corresponding to the job type that is acquired in step S201 is started to be performed on the image data stored in the RAM 102. For example, in a case of the copy job or the high-speed copy job, the CPU 101 drives the printer 113 via the printer I/F 107 to start printing an image. In a case of the facsimile transmission job, the CPU 101 transmits the image data by facsimile via the facsimile I/F 104. In a case of the scan job, the CPU 101 stores the image data stored in the RAM 102 in the USB memory connected to the image processing apparatus 1 via the USB I/F 116.

In step S207, the CPU 101 determines whether the reading of the conveyed document in step S206 is completed. The ADF 201 detects discharge of the conveyed document to the sheet discharging tray 203 using the sensor (not illustrated). The CPU 101 acquires a result of the detection by the sensor and determines whether the document that has been read is discharged. In step S207, the CPU 101 determines that the reading of the document is completed if the document that has been read is discharged. In step S207, if the CPU 101 determines that reading of one document is not completed (NO in step S207), the processing returns to step S206, and the CPU 101 performs the reading of the document of which the reading has not been completed yet.

If the reading of one document is completed (YES in step S207), in step S208, the CPU 101 counts up the value of the scan counter, which is stored in the NVRAM 115, by one. The value of the scan counter is zero until the ADF 201 starts conveying a document. The scan counter counts the number of documents conveyed continuously from when the ADF 201 starts conveying the documents.

After counting up the scan counter, the CPU 101 reads the scanning number 402 acquired in step S202. Then, in step S209, the CPU 101 determines whether the count of the scan counter is greater than the scanning number 402. In the present embodiment, a condition for the image processing apparatus 1 to start the temperature reduction control is that the count of the scan counter exceeds the scanning number 402 stored in the temperature reduction control information table.

If the count of the scan counter is not greater than the scanning number 402 (NO in step S209), the processing proceeds to step S212. In a case where the count of the scan counter is not greater than the scanning number 402, the temperature of the ADF motor 312 of the image processing apparatus 1 is lower than a predetermined temperature, whereby the ADF 201 is capable of continuously conveying the documents. Thus, the image processing apparatus 1 conveys the next document without performing the temperature reduction control.

If the count of the scan counter is greater than the scanning number 402 (YES in step S209), the processing proceeds to step S210. In a case where the count of the scan counter is greater than the scanning number 402, the number of documents conveyed continuously by the ADF 201 exceeds the scanning number 402. As a result, the temperature of the ADF motor 312 may be increased. Thus, the image processing apparatus 1 executes the temperature reduction control in steps S210 and S211.

In step S210, the CPU 101 controls the ADF motor driving circuit 311 to stop the ADF motor 312. The CPU 101 stops driving of the ADF motor 312 for the time specified by the motor stop time 404 acquired in step S202.

Then, in step S211, the CPU 101 resets the elapsed time from completion of a scan that is stored in the NVRAM 115, and starts measuring an elapsed time from completion of a scan. In this way, the image processing apparatus 1 is capable of measuring the time from when the conveyance of the previous document is completed to when the next document is read while the image processing apparatus 1 executes the temperature reduction control. Then, if the measured elapsed time from completion of a scan exceeds the reset time in the temperature reduction control information table, the CPU 101 determines that the temperature of the ADF motor 312 is sufficiently decreased.

Thereafter, in step S212, the CPU 101 determines whether there is a document to be read next on the sheet feeding tray 202 of the ADF 201. The processing executed in step S212 by the CPU 101 is similar to the processing in step S101 in FIG. 7. The CPU 101 acquires a result of the detection by the sensor (not illustrated) of the ADF 201 and determines whether there is a document placed on the sheet feeding tray 202. In step S212, if the CPU 101 determines that there is no document placed on the sheet feeding tray 202 of the ADF 201 (NO in step S212), the process illustrated in FIG. 8 is ended to end the ADF scan processing. If the CPU 101 determines that there is a document placed on the sheet feeding tray 202 of the ADF 201 (YES in step S212), the processing returns to step S206.

In the present embodiment, the ADF scan processing is ended if there is no document placed on the sheet feeding tray 202 of the ADF 201. Alternatively, in step S212, if there is no document placed on the sheet feeding tray 202 of the ADF 201, an operation can be performed to prompt the user to specify whether to continue the document reading. For example, in step S212, if there is no document placed on the sheet feeding tray 202 of the ADF 201, the CPU 101 displays, on the display 600, a screen that prompts the user to select whether to continue the document reading. The user places a document to be read next on the sheet feeding tray 202 of the ADF 201 and inputs an instruction to continue the document reading to the image processing apparatus 1. The processing can be returned to step S203 in response to the user instruction.

In the present embodiment, there is provided the motor stop time during which driving of the motor is stopped between completion of discharge of a document and discharge of the next document if the motor is used for a long time and the temperature of the motor is increased. In this way, an excessive increase in the temperature of the motor that drives the rollers for conveying documents can be restrained even if the image processing apparatus 1 does not include a configuration such as a fan for restraining the increase in the temperature of the motor.

In the present embodiment, the motor stop time 404 is changed for each of the job types. In this way, in a job of a first job type for which a document reading interval cannot be set longer than a predetermined time, the motor stop time is set shorter than the predetermined time to prevent the document reading interval from being set longer than the predetermined time. Meanwhile, in a job of a second job type different from the first job type, the motor stop time is set shorter than the motor stop time in execution of the job of the first job type. In this way, the time needed for the temperature of the motor to decrease after the document reading is completed can be reduced.

In the present embodiment, the number of documents conveyed by the ADF 201 is counted by the scan counter, and the count of the scan counter is compared with the scanning number 402 to determine whether to perform the temperature reduction control. In this way, the image processing apparatus 1 can start the temperature reduction control before the temperature of the ADF motor 312 exceeds a predetermined temperature without any mechanism for measuring the temperature of the ADF motor 312 or any mechanism for estimating the temperature of the ADF motor 312.

In the present embodiment, the CPU 101 performs the temperature reduction control if the condition is satisfied that the count of the scan counter becomes equal to or greater than the scanning number 402 stored in the temperature reduction control information table. The condition for the CPU 101 to start the temperature reduction control, however, is not limited to the above-described condition. For example, the scanner 112 can include a measurement unit for measuring the temperature of the ADF motor 312, and the CPU 101 can start the temperature reduction control if the temperature measured by the measurement unit exceeds the predetermined temperature. At this time, the CPU 101 may end the temperature reduction control if the temperature measured by the measurement unit during the temperature reduction control becomes lower than a predetermined temperature. The predetermined temperature is a predetermined temperature lower than a limit temperature up to which the ADF motor 312 is usable.

Alternatively, the NVRAM 115 can store a continuous driving time of the ADF motor 312, and the CPU 101 can determine whether to perform the temperature reduction control based on the driving time of the ADF motor 312 that is read from the NVRAM 115. For example, if the driving time of the ADF motor 312 is longer than a predetermined threshold value, the CPU 101 performs the temperature reduction control, whereas if the driving time thereof is shorter than the predetermined threshold value, the CPU 101 does not perform the temperature reduction control. Yet alternatively, the CPU 101 can estimate the amount of heat accumulated in the ADF motor 312 from the driving time and the stop time of the ADF motor 312, and the CPU 101 can perform the temperature reduction control if the amount of heat is greater than a predetermined amount of heat.

In the present embodiment, the job type 401 in the temperature reduction control information table is classified into three types, the high-speed copy job, the facsimile transmission job, and the scan job. How to classify the job type is not limited to the above-described method. For example, the job type 401 can be classified into two types, the facsimile transmission job and other jobs. In this case, the motor stop time 404 of the facsimile transmission job is set to a time period that causes no communication error even if the documents are not read continuously during facsimile transmission. Meanwhile, the motor stop time 404 of the other jobs is set longer than the motor stop time 404 of the facsimile transmission job. In this way, in the facsimile transmission job, an increase in the temperature of the ADF motor 312 is restrained without causing any communication error, whereas in the other jobs, the time from when the job is ended to when the temperature of the motor is decreased can be reduced.

Further, in the present embodiment, the motor stop time during the temperature reduction control is set to the predetermined time. Alternatively, the motor stop time can be set by the user. At this time, a lower limit of the stop time that can be set by the user is the time that enables to restrain the increase in the temperature of the motor, whereas an upper limit of the stop time that can be set is the time period that the job is not suspended although the document conveyance is not suspended. In addition, the image processing apparatus 1 may change the scanning number 402 and the reset time 403 based on the stop time set by the user.

In the present embodiment, the motor stop time of the copy job/scan job and the motor stop time of the high-speed copy job are set longer than the motor stop time of the facsimile transmission job. Alternatively, the motor stop time of the copy job/scan job and the motor stop time of the high-speed copy job may be set longer than the time until when the communication is disconnected due to absence of image data to be received by the reception-side image processing apparatus in the facsimile transmission and reception. More specifically, in the image processing apparatus that performs facsimile transmission using the G3 standards, the motor stop time of the copy job/scan job and the motor stop time of the high-speed copy job may be set longer than six seconds determined by the G3 standards.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to embodiments, it is to be understood that the invention is not limited to the disclosed embodiments. The scope of the following claims is to be accorded the broadest interpretation so as to encompass all such modifications and equivalent structures and functions.

This application claims the benefit of Japanese Patent Application No. 2017-191755, filed Sep. 29, 2017, which is hereby incorporated by reference herein in its entirety.

What is claimed is:

1. An image processing apparatus comprising:
    a document sheet conveyance unit configured to drive a driving portion to convey document sheets one by one from a stack of document sheets;
    a reading unit configured to read an image on a document sheet conveyed by the document sheet conveyance unit;
    a transmission unit configured to transmit, by facsimile, image data generated by the reading unit reading the document sheet to an external image processing apparatus;
    an output unit configured to output the image data generated by the reading unit reading the document sheet using a method different from transmission by facsimile; and
    a conveyance control unit configured to stop driving of the driving portion for a predetermined time period after conveyance of the document sheets by the document sheet conveyance unit is started and before reading of the document sheets by the reading unit is completed,
    wherein the predetermined period is a first time period when the conveyance control unit stops the driving portion while a first job of transmitting the image data by facsimile is executed by the transmission unit concurrently with reading of the document sheet by the reading unit, wherein the first time period is shorter than a reference time period, wherein a line is disconnected with the image processing apparatus in a case where the external image processing apparatus does not receive the image data continuously during the reference time, and
    wherein the predetermined period is a second time period when the conveyance control unit stops the driving portion while a second job of outputting the image data is executed by the output unit concurrently with reading of the document sheet by the reading unit, wherein the second time period is longer than the first time period.

2. The image processing apparatus according to claim 1, wherein during the transmission of the image data by the transmission unit or during the outputting of the image data by the output unit, the conveyance control unit does not stop the driving of the driving portion for the predetermined time period after conveyance of the document sheets by the document sheet conveyance unit is started and before reading of the document sheets by the reading unit is completed until a predetermined condition is satisfied, and if the predetermined condition is satisfied, the conveyance control unit stops the driving of the driving portion for the predetermined time period after conveyance of the document sheets by the document sheet conveyance unit is started and before reading of the document sheets by the reading unit is completed.

3. The image processing apparatus according to claim 2, further comprising a counting unit configured to count a number of document sheets conveyed by the document sheet conveyance unit,
    wherein the predetermined condition is a condition that the number of document sheets counted by the counting unit exceeds a predetermined value.

4. The image processing apparatus according to claim 3, wherein the predetermined value corresponding to the first job is less than the predetermined value corresponding to the second job.

5. The image processing apparatus according to claim 3, further comprising:
    a measurement unit configured to measure an elapsed time from when the reading unit completes reading of the document sheets; and
    a resetting unit configured to reset the number of document sheets counted by the counting unit according to the elapsed time measured by the measurement unit.

6. The image processing apparatus according to claim 5, wherein the elapsed time from when reading of the document sheet to generate the image data to be transmitted in the first job is completed to when the resetting unit resets the number of document sheets is longer than the elapsed time from when reading of the document sheet to generate the image data to be output in the second job is completed to when the resetting unit resets the number of document sheets.

7. The image processing apparatus according to claim 1, wherein the output unit is a memory control unit that stores, in a storage apparatus connected to the image processing apparatus, the image data generated by reading the document sheet by the reading unit, and
    wherein the second job is a job of storing the image data in the storage apparatus by the memory control unit.

8. The image processing apparatus according to claim 1, wherein the reference time period is a time period that is determined by a communication standard used in a transmission job performed by the transmission unit and in which a communication is disconnected if there is no image data to be received.

9. The image processing apparatus according to claim 1,
wherein the output unit is a printing unit that prints the image data generated by reading the document sheet by the reading unit, and
wherein the second job is a job of printing an image by the printing unit using the image data generated by reading the document sheet by the reading unit.

10. A method of controlling an image processing apparatus, the method comprising:
driving a driving portion to convey document sheets one by one from a stack of document sheets;
reading an image on a conveyed document;
transmitting, by facsimile, the image data generated by the reading of the document sheet to an external image processing apparatus;
outputting the image data generated by the reading of the document sheet using a method different from transmission by facsimile; and
stopping the driving of the driving portion for a predetermined time period after conveyance of the document sheets is started and before reading of the document sheets is completed,
wherein the predetermined time period is a first time period when the driving portion is stopped while a first job of transmitting the image data by facsimile is executed concurrently with reading of the document sheet, wherein the first time period is shorter than a reference time period, wherein a line is disconnected with the image processing apparatus in a case where the external image processing apparatus does not receive the image data continuously during the reference time, and
wherein the predetermined time period is a second time period when the driving portion is stopped while a second job of outputting the image data is executed concurrently with reading of the document sheet, wherein the second time period is longer than the first time period.

11. A non-transitory computer-readable storage medium that stores a program for causing a computer to execute the method of controlling an image processing apparatus according to claim 10.

* * * * *